(12) United States Patent
Koelle et al.

(10) Patent No.: US 6,830,118 B2
(45) Date of Patent: Dec. 14, 2004

(54) DRIVETRAIN FOR A MOTOR VEHICLE

(75) Inventors: Gerhard Koelle, Wiernsheim (DE); Peter Ahner, Boeblingen (DE); Harald Tschentscher, Grossbottwar (DE); Manfred Ackermann, Oppenweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,871

(22) PCT Filed: Dec. 23, 2000

(86) PCT No.: PCT/DE00/04657

§ 371 (c)(1),
(2), (4) Date: Oct. 19, 2001

(87) PCT Pub. No.: WO01/63122

PCT Pub. Date: Aug. 30, 2001

(65) Prior Publication Data

US 2003/0102173 A1 Jun. 5, 2003

(30) Foreign Application Priority Data

Feb. 22, 2000 (DE) .......................... 100 07 957

(51) Int. Cl.⁷ ................................................ B60K 6/00
(52) U.S. Cl. .................... 180/65.2; 180/54.1; 180/65.3
(58) Field of Search .............................. 180/65.2, 65.3, 180/65.6, 65.8, 54.1

(56) References Cited

U.S. PATENT DOCUMENTS

| 4,414,937 | A | 11/1983 | Noba | |
| 6,202,776 | B1 * | 3/2001 | Masberg et al. | 180/65.2 |
| 6,209,672 | B1 * | 4/2001 | Severinsky | 180/65.2 |
| 6,376,927 | B1 * | 4/2002 | Tamai et al. | 290/40 C |
| 6,394,208 | B1 * | 5/2002 | Hampo et al. | 180/65.2 |
| 6,416,437 | B2 * | 7/2002 | Jung | 475/8 |
| 6,476,573 | B2 * | 11/2002 | Omata et al. | 318/445 |
| 6,484,833 | B1 * | 11/2002 | Chhaya et al. | 180/65.4 |
| 6,492,741 | B1 * | 12/2002 | Morimoto et al. | 290/40 C |
| 6,524,217 | B1 * | 2/2003 | Murakami et al. | 477/5 |
| 6,585,066 | B1 * | 7/2003 | Koneda et al. | 180/65.2 |
| 6,593,713 | B2 * | 7/2003 | Morimoto et al. | 318/139 |
| 6,600,980 | B1 * | 7/2003 | Kraska et al. | 701/22 |

FOREIGN PATENT DOCUMENTS

EP          0 848 159 A      6/1998

* cited by examiner

Primary Examiner—Christopher P. Ellis
Assistant Examiner—J. Allen Shriver
(74) Attorney, Agent, or Firm—Michael J. Striker

(57) ABSTRACT

The invention relates to a drive train for a motor vehicle, having an internal combustion engine (1), having an electric machine (2), which upon starting of the engine (1) generates a torque, and having a clutch (3), which is disposed between the engine (1) and a gear train (4) by way of which a torque generated by the engine (1) can be transmitted to at least one vehicle drive wheel. A mechanism (5, 6) is provided, which upon starting of the engine can actuate the clutch (3) in such a way that a first part of the torque generated upon starting of the engine by the electric machine (2) is transmitted to the at least one vehicle drive wheel, and a second part of the torque generated by the electric machine and sufficient for starting the engine is transmitted to the engine.

19 Claims, 2 Drawing Sheets

*FIG. 1*
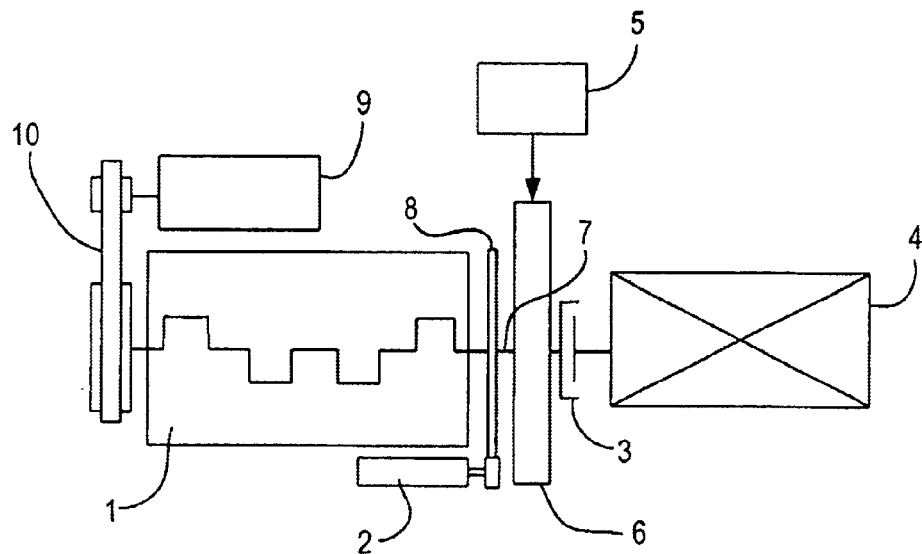
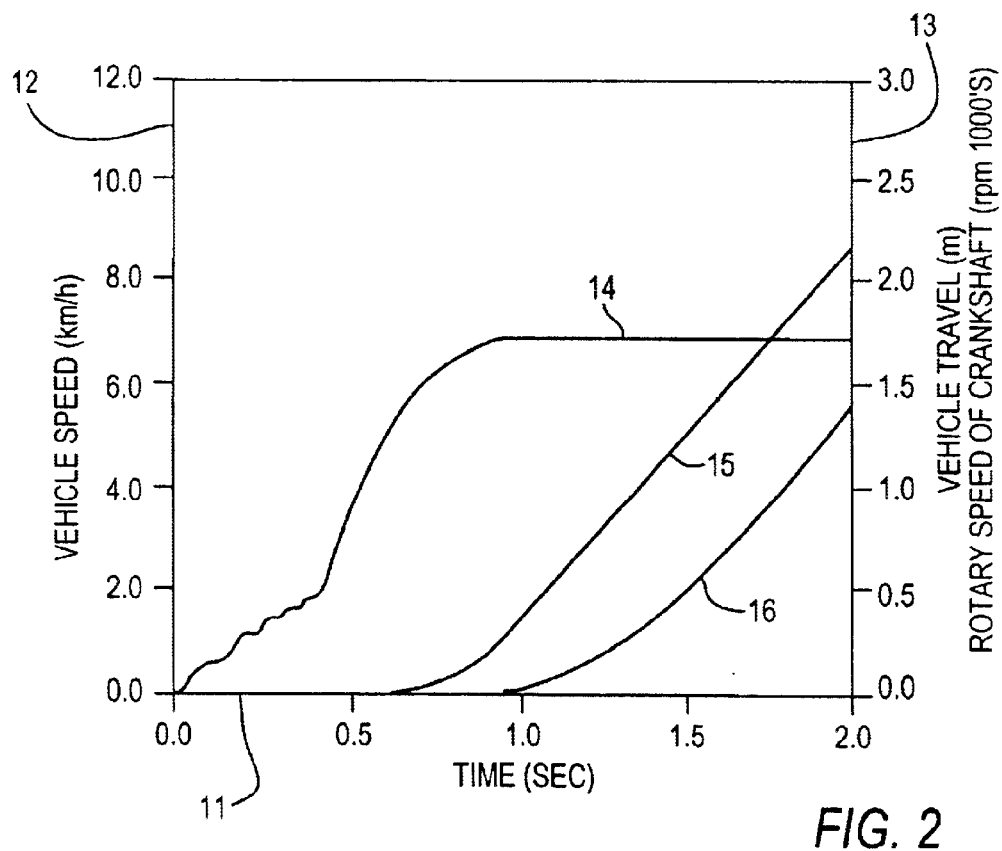
*FIG. 2*

DRIVETRAIN FOR A MOTOR VEHICLE

BACKGROUND OF THE INVENTION

The invention relates to a drive train for motor vehicles.

In order to realize the starting operation of an internal combustion engine, electric machines are predominantly used; in the normal case, to start the engine a starter pinion is made to engage the flywheel teeth. The electric machines used to start internal combustion engines are as a rule direct-current, alternating-current or rotary-current motors. However, electric machines in the form of starter-generators are gaining increasing importance; for starting the engine, they are operated as an electric motor, while during operation of the engine, they are operated as a generator.

The electric direct-current series motor is especially suitable as a starter motor, because it develops the requisite high initial torque to overcome the resistances to turning over and to accelerate the engine masses. This is necessary because each time an engine is started, considerable resistances are presented by the engine sealing, piston friction, and bearing friction. In addition, both the model type and the number of cylinders of the engine, the lubricant used, and the current engine temperature all play an essential role in the operation of starting the engine.

The torque of the starter is predominantly transmitted to the flywheel on the engine crankshaft via a pinion and a ring gear. In isolated cases, however, belts, V-belts, toothed belts, chains, or direct transmission to the crankshaft is selected. The pinion starter, however, because of the high ratio between the starter pinion and ring gear of the engine flywheel is best suited for a starting operation, because it can be designed for a low torque at high rpm. This design makes it possible to keep the dimensions of the starter small and its weight low.

The starter must crank the combustion event with a minimum rpm, called a starting rpm, so that even under unfavorable operating conditions, the requisite air-fuel mixture for sustained operation in the Otto engine can be formed, or in the case of the diesel engine, the self-ignition temperature can be attained. In addition, the starter must support the engine after the first ignitions as it runs up to its minimum sustained rpm.

Especially when a vehicle with automatic start-stop control is involved, the engine has to be started frequently.

Not until the engine has accelerated to an rpm sufficient for outputting power can the clutch be closed, and the vehicle starts to move.

When the engine has been turned off at a traffic light, re-starting the engine is especially problematic, because the starting of the engine creates an idle time until the vehicle begins to move.

Another problem can occur for instance because the starting process in start-stop systems is initiated by the actuation of the accelerator pedal; that is, to actuate the accelerator pedal, the driver must take his foot off the brake to start the vehicle. As a result, if the vehicle is stopped on a slope, the vehicle can roll backward during the idle time, unless the driver has taken the precaution of actuating the emergency brake. On starting up, the driver must then release the emergency brake at the right instant, so that the engine will not work against the brake.

To solve this problem, a mechanical device disposed inside the gear train has already been proposed; it prevents the vehicle from rolling counter to the desired travel direction, which is detected from the gear that has been selected.

SUMMARY OF THE INVENTION

Because, in the drive train according to the invention for a motor vehicle, means are provided, which upon starting of the engine can actuate the clutch in such a way that a first part of the torque generated upon starting of the engine by the electric machine is transmitted to the at least one vehicle drive wheel, and a second part of the torque generated by the electric machine and sufficient for starting the engine is transmitted to the engine, the aforementioned problems can be overcome without requiring a mechanical device disposed inside the gear train.

The means can include a control device, for which preferably temperature- and/or rpm-dependent performance graphs for the drive torque of the engine and/or for the starting torque and/or for the clutch engagement moment, which is predominantly dependent on the clutch engagement travel, are used. It is also conceivable that these performance graphs are varied adaptively.

The means can include a regulating device. The controlled variable of the regulating circuit can be formed for instance by the crankshaft rpm. The guide variable, that is, the variable whose value the task variable is supposed to assume under defined conditions, can in this case be the crankshaft rpm, for instance, beyond which the engine is capable of outputting power. The final control element can be formed for instance by an automatic clutch.

The regulating device can regulate the torque, transmitted upon starting of the engine by the electric machine to the at least one vehicle drive wheel, in such a way that rotational irregularities of the engine upon starting of the engine are decoupled from the at least one vehicle drive wheel.

This decoupling of the rotational irregularities can be effected at least until such time as the engine has reached an rpm at which it is capable of outputting power. It is also conceivable that the regulating device regulates the torque, transmitted upon starting of the engine by the electric machine to the at least one vehicle drive wheel, in such a way that the vehicle is kept at a stop until the engine has reached an rpm at which it can output power.

Although such regulation would prevent the vehicle from rolling backward on a slope, still it would not eliminate the idle time mentioned above.

Regardless of the especially selected regulation, the sensors can be provided, which detect an exceptional state in which the vehicle, because of external forces, would undesirably put itself into motion, because the torque transmitted upon starting of the electric machine to the at least one vehicle drive wheel is too low to prevent the unwanted motion of the motor vehicle.

These external forces include for instance gravity, which when a vehicle on a slope begins to move can lead to an unwanted motion of the motor vehicle It is conceivable that the exceptional state detected by the sensors is indicated to the driver in some suitable way, for instance visually and/or acoustically and/or by feel.

It is also conceivable that a vehicle brake is provided, which is actuated automatically upon the occurrence of the exceptional state, in order to prevent the unwanted motion of the motor vehicle.

This vehicle brake is preferably the service brake that is present anyway, or the brake connected to the usual brake system.

In that case, it is advantageous if the vehicle brake is automatically released when the engine has reached an rpm at which it can output power, that is, in a state in which the vehicle can put itself into motion in the desired direction.

It is also conceivable that the regulating device regulates the torque, transmitted upon starting of the engine by the electric machine to the at least one vehicle drive wheel, in such a way that the motor vehicle puts itself in motion, before the engine has reached an rpm at which it can output power.

In this variant regulation, both unwanted rolling backward and the idle time mentioned above can be avoided, since the motor vehicle can already put itself into motion as a result of the torque generated by the electric machine.

The means provided in accordance with the invention preferably include an automatic clutch, which actuates the clutch.

In this case, the regulating device can trigger the automatic clutch.

The advantages attained by the present invention are particularly effective if a motor vehicle is involved in which an automatic start-stop control is provided, which can stop the engine when the vehicle is stopped, for instance at a red light, and re-start it for driving on again.

It can be advantageous that only in stop and go operation of the motor vehicle, but not the first time an engine is started on a given trip, the first part of the torque generated upon starting by the electric machine is transmitted to the at least one drive wheel.

The electric machine can either be (exclusively) a starter, or it can be a so-called starter-generator, which when the engine is started is operated as an electric motor and when the engine is running is operated as a generator.

BRIEF DESCRIPTION OF THE DRAWINGS

The invention will be described in further detail below in conjunction with the associated drawings.

Shown are:

FIG. 1, a fundamental arrangement of one version of the drive train according to the invention;

FIG. 2, the relationship between the crankshaft rpm, the vehicle speed, and the distance traveled, for a vehicle that has a conventional drive train.

DETAILED DESCRIPTION OF THE PREFERRED EMBODIMENTS

Figure 3:
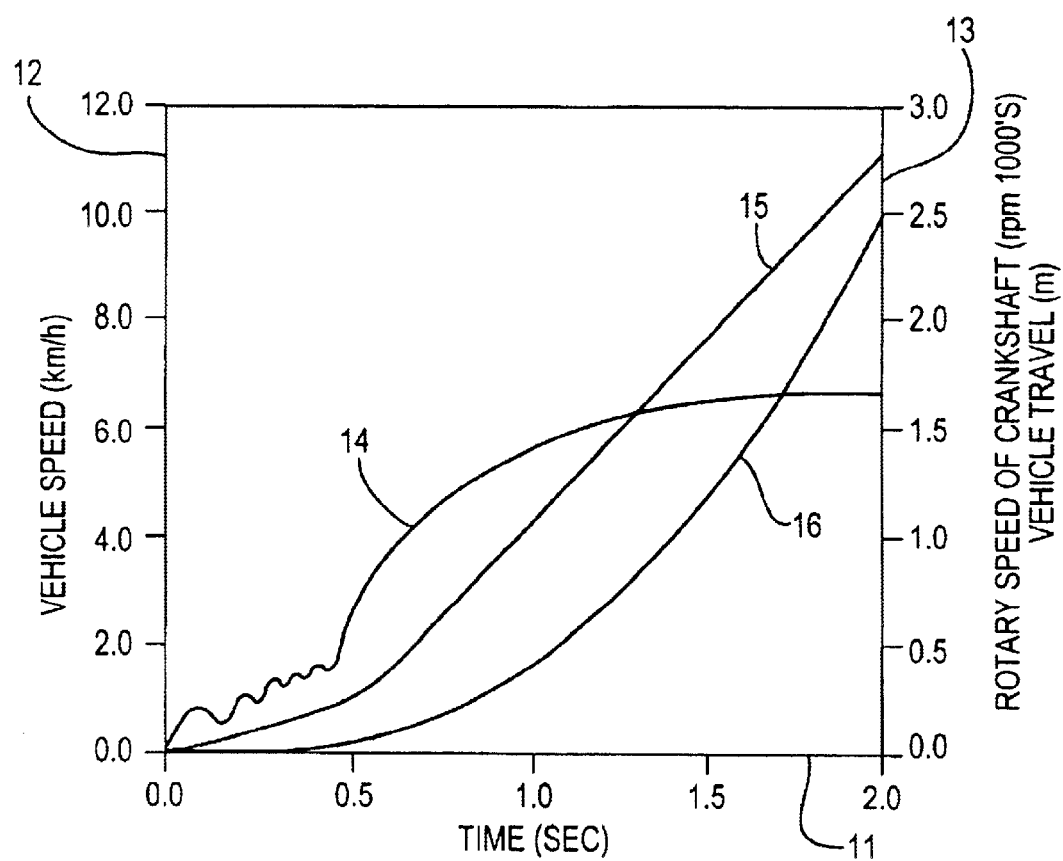
FIG. 3, the relationship between the crankshaft rpm, the vehicle speed, and the distance traveled, for a vehicle that is equipped with a drive train according to the invention.

In FIG. 1, one version of a drive train for a motor vehicle according to the present invention is shown. The drive train includes an internal combustion engine 1, whose power takeoff is formed by a crankshaft 7. A flywheel 8 which has toothing on the outside is disposed on the crankshaft 7. The starter pinion of a starter 2 engages this toothing on the outside, at least in the starting operation.

A generator 9, which is of no further particular interest, is also suggested in the drawing; it is also connected to the crankshaft 7, via a V belt 10.

The drive train shown also includes a clutch 3, which is disposed between the engine 1 and a gear train 4, by way of which train a torque, generated by the engine, can be transmitted to at least one vehicle drive wheel, not shown. The means are provided, which upon starting of the engine can actuate the clutch 3 in such a way that a first part of the torque generated upon starting of the engine 1 by the electric machine (in the form of a starter 2) is transmitted to the at least one vehicle drive wheel, and a second part of the torque generated by the starter 2 and sufficient for starting the engine 1 is transmitted to the engine 1, are formed in the case shown by a regulating device 5 and an automatic clutch 6.

In the case shown, the starting system of the engine 1 is dimensioned such that secure starting is possible even at extremely low temperatures.

If an automatic start-stop control is provided, the re-starting takes place with the engine 1 at its operating temperature; this requires substantially less starting power than the engine 1 that has not yet reached its operating temperature.

This excess power of the starter system can be utilized to prevent the vehicle from rolling in an unwanted direction and/or to set the vehicle into motion even during the start, to avoid the disadvantage of the above-described idle time.

The regulation of the system is effected by limiting the starting torque, in such a way that rotational irregularities of the engine upon its start and on run-up to speed are decoupled from the rest of the drive train, and that unpredictable vehicle accelerations are avoided.

The motor vehicle is kept in the stopped phase via the clutch 3 and a selected gear.

In the exemplary embodiment shown, the regulating device regulates the torque, transmitted upon starting of the engine 1 by the electric machine 2 to the at least one vehicle drive wheel, in such a way that the motor vehicle puts itself in motion, before the engine 1 has reached an rpm at which it can output power. In other words, the run-up to speed of the engine 1 and the process of vehicle acceleration overlap, thus eliminating or at least considerably shortening the idle time on starting up. On uphill slopes, as a rule no additional interventions on the part of the driver are needed.

Upon starting of the engine 1, the clutch 3 is actuated by the automatic clutch 6 to such an extent that the transmissible torques suffices to stop the vehicle or accelerate it slightly. Once the requisite rpm of the engine 1 for outputting power is reached, the clutch 3 is closed again, and the motor vehicle is accelerated. On level ground or on small uphill slopes, the minimum value for the alternating moments of the engine 1 suffices.

Although not shown in detail here, it is conceivable, instead of a conventional starter, to use more-powerful systems with a lower ratio to the crankshaft. Such higher-power systems would assure even better support of run-up to speed and thus a complete overlap of starting and acceleration of the vehicle.

In FIGS. 2 and 3, the vehicle speed is plotted in km/h on the left-hand vertical axis 12. The vehicle travel in meters and the rotary speed of the crankshaft 7 in thousands of rpm are plotted on the right-hand vertical axis 13, while the time in seconds is plotted on the horizontal axis 11. The various characteristic curves are 14 for the crankshaft speeds, 15 for the vehicle speeds, and 16 for the distances traveled.

In FIGS. 2 and 3, in each case only the startup phase is shown, in which the transmissible moment of the clutch 3 is increased continuously. The full adhesion is not shown.

FIG. 2, which shows a conventional vehicle start for a vehicle with a starter-generator, shows the aforementioned idle time, which elapses between the beginning of the starting process, that is, when the crankshaft begins to turn, and the beginning of the vehicle motion. In the case shown, this idle time amounts to approximately 0.7 seconds.

FIG. 3 shows the starting operation of a vehicle which is equipped with a drive train according to the invention; it shows vehicle start after a temporary stop, with a starter-generator and a gear selected.

Because some of the torque generated by the electric machine 2 is transmitted to at least one vehicle drive wheel from the instant when the crankshaft turns over, the idle time is deleted; especially in vehicles with an automatic start-stop control, this is a major advantage.

What is claimed is:

1. A drive train for a motor vehicle, having an internal combustion engine (1) and an electric machine (2), wherein said electric machine generates a torque upon starting of the engine (1), and having a clutch (3), wherein said clutch is disposed between the engine (1) and a gear train (4) by way of which a torque generated by the engine (1) can be transmitted to at least one vehicle drive wheel, wherein means (5, 6) are provided, wherein said means, upon starting of the engine, can actuate the clutch (3) in such a way that a first part of the torque generated upon starting of the engine by the electric machine (2) is transmitted to the at least one vehicle drive wheel, and a second part of the torque generated by the electric machine (2) and sufficient for starting the engine (1) is transmitted to the engine, wherein sensors are provided, wherein said sensors detect an exceptional state in which the motor vehicle, because of external forces, would undesirably put itself into motion, because the torque transmitted upon starting of the electric machine to the at least one vehicle drive wheel is too low to prevent the unwanted motion of the motor vehicle.

2. The drive train of claim 1, wherein the means includes a control device (5).

3. The drive train of claim 2, wherein for the control device (5), temperature- and/or rpm-dependent performance graphs for the drive torque of the engine (1) and/or for the starting torque and/or for the clutch engagement moment, which is predominately dependent on the clutch engagement travel, are used.

4. The drive train of claim 3, wherein the performance graphs are varied adaptively.

5. The drive train according to claim 1, wherein the means include a regulating device (5).

6. The drive train of claim 5, wherein the regulating device regulates the torque, transmitted upon starting of the engine (1) by the electric machine (2) to the at least one vehicle drive wheel, in such a way that rotational irregularities of the engine (1) upon starting of the engine (1) are decoupled from the at least one vehicle drive wheel.

7. The drive train of claim 6, the decoupling of the rotational irregularities is effected at least until such time as the engine (1) has reached an rpm at which it is capable of outputting power.

8. The drive train of claim 5, wherein the regulating device regulates the torque, transmitted upon starting of the engine (1) by the electric machine (2) to the at least one vehicle drive wheel, in such a way that the motor vehicle is kept at a stop until the engine (1) has reached an rpm at which it can output power.

9. The drive train of claim 1, wherein the exceptional state detected by the sensors is indicated to the driver.

10. The drive train of claim 1, wherein a vehicle brake is provided, wherein said vehicle brake is actuated automatically upon an occurrence of the exceptional state.

11. The drive train of claim 1, wherein the vehicle brake is automatically released when the engine (1) has reached an rpm at which it can output power.

12. The drive train of claim 5, wherein the regulating device regulates the torque, transmitted upon starting of the engine (1) by the electric machine (2) to the at least one vehicle drive wheel, in such a way that the motor vehicle puts itself in motion, before the engine (1) has reached an rpm at which it can output power.

13. The drive train of claim 5, wherein the means include an automatic clutch (6), wherein said automatic clutch (6) actuates the clutch (3).

14. The drive train of claim 13, wherein the regulating device (5) triggers the automatic clutch.

15. The drive train of claim 1, wherein an automatic start-stop control is provided, which wherein said start-stop control can stop the engine when the motor vehicle is stopped and re-start it for driving on again.

16. The drive train of claim 1, wherein only in stop and go operation of the motor vehicle, but not a first time an engine is started on a given trip, the first part of the torque generated upon starting by the electric machine (2) is transmitted to the at least one drive wheel.

17. The drive train of claim 1, the electric machine (2) is a starter.

18. The drive train of claim 1, the electric machine (2) is a starter-generator.

19. A drive train for a motor vehicle, having an internal combustion engine (1) and an electric machine (2), wherein said electric machine generates a torque upon starting of the engine (1), and having a clutch (3), wherein said clutch is disposed between the engine (1) and a gear train (4) by way of which a torque generated by the engine (1) can be transmitted to at least one vehicle drive wheel, wherein means (5, 6) are provided, wherein said means, upon starting of the engine, can actuate the clutch (3) in such a way that a first part of the torque generated upon starting of the engine by the electric machine (2) is transmitted to the at least one vehicle drive wheel, and a second part of the torque generated by the electric machine (2) and sufficient for starting the engine (1) is transmitted to the engine, wherein the regulating device regulates the torque, transmitted upon starting of the engine (1) by the electric machine (2) to the at least one vehicle drive wheel, in such a way that the motor vehicle puts itself in motion, before the engine (1) has reached an rpm at which it can output power.

* * * * *